(12) United States Patent
Scarbrough

(10) Patent No.: X8757
(45) Date of Patent: Apr. 8, 1835

(54) PROPELLING STEAM BOATS, & OTHER VESELS

(76) Inventor: William Scarbrough

William Scarbrough . Savannah Georgia

Letters Patent

The schedule referred to in these Letters Patent and making part of the same containing a description in the words of the said William Scarbrough himself of his improvement in the construction and Propulsion of Steam or other Boats.

To all whom these presents shall come. Be it known that I William Scarbrough of the City of Savannah in Chatham County State of Georgia have invented new and useful improvements in the Construction and Propulsion of Steam or other Boats & that the following is a full and exact description thereof.

The accelerated Progress of the Vessels or Boats as above set forth is to be carried at firstly by the diminution of resistance in the water navigated; & Secondly by the increase of the travel of the wheels or other mode of propulsion through the water. The diminution of resistance is to be come at by the greatest possible reduction of the immersion or draft of water of the Vessels or Boats & by the formation of their Models so as to keep them whilst in motion skimming as nearly as possible upon the Surface. Therefore the bottom of these Vessels or Boats at the main point of bearing should be as nearly as possible flat, without more than inch or two of dead rise; the greatest breadth should be considerably abaft the centre perhaps most advantageously within one third of the whole length counted from the Stern Post. From this point the run should commence tapering aft; and from a few feet forward should commence tapering to the bows in both cases gradually in rounding lines so as to obtain the greatest possible buoyancy or bearing. With the double object of facilitating the Steering of the Vessel or Boat and keeping the same as much as possible upon the Surface so as to cause the displaced water when escaping from the superincumbent pressure to raise as high as possible on the forward part of the propelling water wheels and afterwards under the counter or stern part the bottom of the Vessel or or boat forward should from 15 to 20 feet more or less according to the size of the Vessel or Boats abaft the stem or cutwater begin gradually to rise or curve up from the straight line of the after part so as to attain the height of from 2 to 3 or even more feet, where a perpendicular line would fall from said Stem or Cut water. The Shaft of the paddle wheels should be pla-
ced right over the abaft end of the greatest breadth of the Vessel or Boat
whereby the displaced water will more readily escape & a very slight yet horizontal
inclination of the buckets of the paddle wheels from a direct right angle from
the hull of the boat will not only carry the displacing water under the coun-
ter and aid the power of the rudder but will tend to lighten the pressure of the
dead water on the said Buckets and the wave of the displaced water in the
act of regaining its level must as a matter of Course urge the Boat or Vessel
Forwards. Secondly in regard to the increase of the travelling of the water wheels
or other mode of propulsion as no Steam or other Engine of any Considerable
length of Stroke could keep in advantageous Motion wheels of any great di-
ameter with the length of buckets or paddles now generally in use where any
considerable resistance was opposed at more than 35 to 30 revolutions in a
minute, increased Celerity could only be come at in piston Engines by the process
of gearing the effect of which would be a material encroachment on the power
of the Engine and attended with considerable risk of breakage.
The object is then to find a remedy for or to overcome these
difficulties or disadvantages. In proportion to the reduction of the diameter of a
wheel so will be the diminution of the travel of its periphery thus one revolution of
a sixteen feet wheel would give but a little over 16 yards whilst the revolution
of one of 20 feet diameter would pass over a little more than 21 yards. In all the
fleet Boats plying on the Hudson Delaware or Chesapeak the diameters of
the paddle wheels have been enlarged to the extent the Capacity of the Boats
and the powers of the Engines would admit; and we have before us the evidence
that Mr Burden could only transcend their velocity principally by the
augmented diameter of his paddle wheel; he could not have done it on
his experimental raft of 75 feet in length. The difficulties & disadvantages
which have been suggested in regard to gearing upon the Engine to obtain
increased Celerity of Motion and the enlargement of the diameter of the
paddle wheels to augment the travel may however safely and easily be
surmounted by shortening the length of the buckets or paddles in a propor-
tionate degree. For example if we place on a wheel 16 feet in diameter
arms 3 feet apart in a straight line near the periphery Buckets 6 feet in length and 2 feet in width the 16 multiplied into each other would exhibit
a superfice of 192 feet square. On a 20 feet wheel with arms at the Same dis
tance apart if Buckets only four feet in length were placed they would be
20 in number which multiplied as above would give a superfice of 160 square
feet. Thus although the reduction in the length of the Bucket was equal
to 33 1/3 p Cent or 1/3 the whole superfice of immersion in the revolution is
reduced only 20 p C or 1/5 whence there is a clear saving of 13 1/3 p C or p or
pressure of the dead or back water. This saving is not an imaginary advantage
we may readily believe when we perceive then generally in the large boats of this Country the
whole length of the Buckets or paddles have been divided into two three or even
more parts. We have thus seen that by the formation of the model so as to di
-minish the resistance of the water & by shortening the paddles or Buckets the
work or labour of the Engine has been so much reduced that much of the risk
of breakage in the event of gearing whether by wheels Bands or otherwise has
been superseded. The consequent increase of velocity will not by any means
be attended with the supposed correspondent loss or diminution of power
which the general rule might seem to indicate for when the impulse or
momentum has been once given the augmented speed of the Boat or Vessel
will more than Compensate the Engine for its first expence of power.

As Stability or solidity of the machinery
if it may be gained is of primary importance for the correct working of ma
-chinery Especially in the Case of gearing it is further proposed as the means
of attaining it that the paddle wheel beams or any part of the boat or
vessel between or beyond them where the pressure is great should be sustained
or supported from the inside of the boat or vessel by the use of projecting inverted
arches resting directly under the beams or on String pieces thereunder connecting
two or more of them and against the Ceiling or sides of the boat or vessel but
not permanently affixed to the same so that the Kelsten or Kelstons acting
in the manner of a Key Stone or Key Stones to the arch, the pressure near the
gunwale or on the upper part of the Boat or Vessel will be transferred to the
Kelsten or Kelstons and they in return if needful will find a reciprocating
& adequate abutment from the equality of pressure at the other side or
the end of the arch there. But Exclusively of this it is Considered that probably rollers or wheels of the largest diameter which can be used would be advan-
tageously employed in steadying the the propelling shafts & partially relieving
the friction in their journals

What I claim as my own invention and not pre-
=viously known in the above described method of constructing & propelling steam
or other Boats is the peculiar formation of the model of the Boat or Vessel as
above described and specified in combination with the increased velocity of
the propelling wheels to obtain by said combination a more rapid pro-
pulsion of the Boat or Vessel as also the application of the inverted wheels and
friction rollers or wheels as above set forth. It is to be observed that I claim no
originality to any of the parts separately. Washington City D^t of Columbia
March 1835

Exd. Witnesses
W.C. [illegible] Waddell
G. [illegible] [illegible]

W^m [illegible]carbrough

[1696 w8]